United States Patent [19]

Roeloffzen

[11] 4,186,229
[45] Jan. 29, 1980

[54] METHOD OF MANUFACTURING BASE PLATES SUITABLE FOR PRESSING RECORDS AND PLATES MANUFACTURED BY THE SAME

[76] Inventor: Johannes F. Roeloffzen, Driekwartweg 5, Sas van Gent, Netherlands

[21] Appl. No.: 859,676

[22] Filed: Dec. 12, 1977

Related U.S. Application Data

[63] Continuation of Ser. No. 747,877, Dec. 6, 1976, abandoned.

[30] Foreign Application Priority Data

Dec. 4, 1975 [GB] United Kingdom .............. 49914/75

[51] Int. Cl.² .......................... B32B 3/02; G11B 3/70; B29D 17/00
[52] U.S. Cl. ..................... 428/65; 156/62.8; 274/41 A; 427/194; 427/203; 427/195; 427/390 A; 427/407 R; 427/211; 428/297; 428/522; 428/526; 428/288
[58] Field of Search ...................... 427/194, 203, 195; 274/41 A, 41 R; 428/65, 297, 522, 526; 264/106, 107; 156/62.2, 62.8

[56] References Cited

U.S. PATENT DOCUMENTS

| | | | |
|---|---|---|---|
| 1,134,774 | 4/1915 | Thomas | 428/65 |
| 1,151,849 | 8/1915 | Aylsworth | 428/65 |
| 1,207,383 | 12/1916 | Edison | 274/41 A |
| 1,370,666 | 3/1921 | Novotny | 274/41 A |
| 1,398,147 | 11/1921 | Novotny | 274/41 A |
| 1,398,148 | 11/1921 | Novotny | 274/41 A |
| 1,440,097 | 12/1922 | Novotny | 428/65 |
| 1,450,739 | 4/1923 | Elliott | 428/65 |
| 1,787,484 | 1/1931 | Laffon | 264/107 |
| 1,937,680 | 12/1933 | Billings | 428/65 |
| 1,994,093 | 3/1935 | Billings | 428/65 |
| 2,606,851 | 8/1952 | O'Mahony et al. | 274/41 R |
| 3,740,286 | 6/1973 | Yasujiro Ban | 274/41 A X |
| 3,983,795 | 10/1976 | Bode | 264/107 X |
| 3,993,518 | 11/1976 | Buck et al. | 156/62.2 X |

*Primary Examiner*—Shrive P. Beck
*Attorney, Agent, or Firm*—Spensley, Horn, Jubas & Lubitz

[57] ABSTRACT

This invention relates to a method for manufacturing base plates suitable for being pressed into records. The method is characterized in that a core layer is formed by compressing fibrous material followed by a coating of a synthetic material.

16 Claims, No Drawings

METHOD OF MANUFACTURING BASE PLATES SUITABLE FOR PRESSING RECORDS AND PLATES MANUFACTURED BY THE SAME

This is a continuation, of application Ser. No. 747,877, filed Dec. 6, 1976 now abandoned.

BACKGROUND OF THE INVENTION

The invention relates to a method of manufacturing base plates suitable for being pressed into records.

1. Field of the Invention

In a known method of manufacturing base plates suitable for being pressed into records the base plates are made as a whole from the same material, for example, PVC. It is known to the expert that vinylchloride, if necessary, provided with pigments is polymerised into polyvinylchloride and subsequently compressed into plates and punched for use in the music record industry. One of the disadvantages of the use of vinylchloride is the toxicity and the patogenity of the gaseous vinylchloride. It is, therefore desirable to use less PVC in the products and to replace it by substances not exhibiting said disadvantages.

2. Prior Art

One of the objects of the invention is to provide a method eliminating the aforesaid disadvantages and this method is characterized in that first a core layer is formed by compressing fibrous material, after which the compressed core layer is coated with a synthetic substance layer suitable for subsequent reception of grooves. It is preferred to use vegetable fibres, in particular, chemically bound and thermally treated vegetable fibres.

SUMMARY OF THE INVENTION

This permits replacing a considerable portion of the noxious PVC by a harmless substance. The core material is preferably flax. In the method according to the invention the base plates are made only partly from the hazardous synthetic material, which part may be less than 50%.

DETAILED DESCRIPTION OF THE INVENTION

The method of manufacturing base plates in accordance with the invention will now be described. This method comprises the following steps.

a. Formation of the fibre film,
b. binding the film by synthetic material,
c. densification of the film treated with the synthetic material into a substrate.
d. compression of the substrate into a core layer,
e. coating of the core with a PVC layer.

The core material is vegetable fibrous material, preferably a kind of flax, for example, crude flax, green flax, cultured flax, or retted flax. The fibres of a length between 15 and 200 mms are randomly arranged in order to obtain the fibre film. The flax fibres are opened and carded and subsequently arranged at random. A number of the layers thus formed are joined one on the other and compressed in order to obtain mechanical rigidity. This mechanical reinforcement may be improved by needle-treatment of the film. The film is subsequently impregnated with a synthetic material dispersion, which may contain colouring substances. There are known various methods of binding fibrous films by synthetic material. For example, the synthetic powder may be distributed on the film by means of a container having an adjustable slot, the film being passed along rollers and a brush roller ensuring a uniform distribution. Binding of the synthetic material is performed by supplying heat, for example by infrared radiation. Then the film bound by synthetic material is guided between cooled rollers. There may also be used a synthetic material dispersion in the form of foam or a dispersion free of softeners. A stable fibre film may furthermore be obtained from vegetable fibres by adding 5% or more of synthetic fibre of low melting point, for example Perlon, by subsequently mixing the fibres and by thermal treatment thereof and by densifying the film by means of a calander machine. Further stabilisation of the film is obtained by dipping the film in a bath containing a synthetic material dispersion and by subsequently pressing and drying it.

The resultant, still hot substrate is compressed between the cooled rollers at a pressure of about 200 kgs/cm$^2$ and subsequent to cooling a uniform core layer of satisfactory form stability is obtained. Compression may be repeated in order to obtain a smooth surface.

Finally the core layer is provided with a PVC coating and compressed to form the base plate. The PVC coating contains all substances required to form a coating suitable for making grooves for the record. The PVC with all desired substances, a mixture forming a ready compound, is preferably applied in the form of a powder and subsequently formed into a layer by heating and compressing. As an alternative a synthetic foil may be applied to the core layer with the aid of coating means including rollers, in which case the coating is applied as a melt, which is subsequently cooled, preferably with the aid of cooled rollers.

The core material thus provided with a PVC layer is then cut up into strips of a width of 32 cms, which are heated at a temperature of about 70° C., preliminarily profiled by means of a preheated rotating roller, provided with punch holes and a profile so as to be ready for pressing a record by means of a cylinder press.

In manufacturing the core layer it is important to use a maximum percentage of vegetable fibres of only one kind so that the properties determining the uniformity of the plate, such as titer, staple length and specific weight of the entire material are the same. This is conducive to avoid unevennesses of the film surface, which is important in pressing a good quality record.

It is found that the presence of vegetable fibres in the base plate has a sound absorbing and hence noise-free effect. Moreover, the presence of the fibre material has an anti-static effect so that the troublesome static phenomenon of PVC is eliminated completely or for the major part. The presence of vegetable fibres in the substrate also provides a satisfactory resistance to bending and a satisfactory rigidity so that in the event of fracture no PVC fragments will be flung around, which might cause damage.

Owing to the presence of a more or less plastic core in the substrate thermal deformations, if any, may be repaired, since deformation of records according to the invention is more reversible than in the case of records solely made from PVC.

The following recapitulation illustrates a preferred method of manufacturing a record in accordance with the invention:

a. Supply of raw material, preferably flax.
b. Formation of fibre film, treatment with a synthetic substance and densification of the film treated with the synthetic substance into a substrate by impregnation and compression on the calander machine the strips of a width of 1 meter or more are obtained.

c. Application of a PVC coating to the substrate, the PVC being preferably applied in the form of a powder or a granulate, which is extruded or pre-plastified, the bottom and top sides being separately provided with a coating. This is performed at a temperature of about 120° C.–135° C., after which the substrate with PVC is calibrated d. The core layer provided with the PVC coating is cut up into strips of a width of about 32 cms, a suitable width for punching records.

e. The strips are preheated at a temperature of about 70° C., preferably by means of infrared radiators or a preheated roller.

f. The preheated strips are profiled at about 70° C., whilst an outer rim and an inner rim are provided, between which grooves can be recorded by pressing and the punch hole is made.

g. The profiled strips are cooled and this semi-product is stored until the record can be made by pressing the profiled base plate.

h. The treatment of the base plates into records is performed by heating the profiled strips at a temperature of about 30° C., preferably by means of infrared radiators or a preheated roller.

i. Pressing the preheated, profiled strips.

j. Cooling at room temperature and labelling.

k. Punching of the profiled, compressed strips to obtain the record.

This method permits of pressing grooves into the semi-product within one second so as to obtain a record; in the case of records solely consisting of PVC such a method required about 30 seconds. It is thus possible to respond considerably sooner to a demand of certain records, which is of paramount importance to the record industry.

I claim:

1. A method for manufacturing records comprising the ordered steps of:
   (a) providing a core film of flax fibers;
   (b) applying a synthetic polymeric binding material to said film so as to bind said fibers together; and
   (c) coating each side of said film with a single coat of vinyl resin.

2. A record produced by the process of claim 1.

3. A method according to claim 1 including the steps of:
   (d) cutting the vinyl-coated film into strips; and
   (e) forming said strips into records.

4. A record produced by the process of claim 3.

5. A method according to claim 1 wherein said core film is formed by the steps of:
   (i) providing a plurality of separate layers of flax fibers having a length of from 15 to 200 mm; and
   (ii) joining each said layer together so as to form said core film.

6. A method according to claim 1 wherein said synthetic material is applied to core film in the form of a powder, said powder and said core film are then heated so as to melt said synthetic material and thereby cause said synthetic material to further bind said flax fibers together.

7. A method according to claim 1 wherein said synthetic material is applied to said core film as a dispersion.

8. A method according to claim 1 wherein said synthetic material is applied to said core film by mixing said flax fibers with a synthetic fiber, said flax and synthetic fibers are then heated so as to melt said synthetic fiber and thereby further bind said flax fibers together.

9. A method according to claim 8 wherein said vinyl resin is polyvinyl chloride which is applied to said core layer at a temperature of 120° C. to 135° C.

10. A method for manufacturing records consisting essentially of the ordered steps of:
    (a) forming a layer of randomly oriented flax fibers;
    (b) joining a plurality of said layers together so as to form a core film;
    (c) impregnating said core film with a synthetic polymeric binding material;
    (d) compressing the now impregnated core film so as to form a core layer; and
    (e) coating each side of said core layer with a single cost of vinyl resin.

11. A record produced by the process of claim 10.

12. A method according to claim 10 wherein said flax fibers have a length of from about 15 to 200 mm.

13. A method according to claim 10 wherein said core layer has a thickness of at least 0.10 mm.

14. A method according to claim 10 including the steps of:
    (f) cutting the vinyl-coated film into strips; and
    (g) forming said strips into records.

15. A record produced by the process of claim 14.

16. A method according to claim 10 wherein the core layer formed in step (d) is further compressed and densified by calendaring said core film a predetermined number of times.

* * * * *